US012442241B2

(12) United States Patent
Kosugi et al.

(10) Patent No.: US 12,442,241 B2
(45) Date of Patent: Oct. 14, 2025

(54) REMOTE CONTROL SYSTEM, CONTROL DEVICE, AND NON-TRANSITORY COMPUTER-READABLE MEDIUM

(71) Applicant: KABUSHIKI KAISHA TOKAI RIKA DENKI SEISAKUSHO, Aichi (JP)

(72) Inventors: Masanori Kosugi, Aichi (JP); Hideki Kawai, Aichi (JP); Kazunori Sobue, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 294 days.

(21) Appl. No.: 17/902,104

(22) Filed: Sep. 2, 2022

(65) Prior Publication Data

US 2023/0088363 A1 Mar. 23, 2023

(30) Foreign Application Priority Data

Sep. 13, 2021 (JP) ................................. 2021-148478

(51) Int. Cl.
*E05F 15/73* (2015.01)
*E05F 15/655* (2015.01)

(52) U.S. Cl.
CPC ............ *E05F 15/73* (2015.01); *E05F 15/655* (2015.01)

(58) Field of Classification Search
CPC ................................ E05F 15/73; E05F 15/655
See application file for complete search history.

(56) References Cited

U.S. PATENT DOCUMENTS

| 2016/0251891 A1* | 9/2016 | Herthan ................. E05F 15/73 49/31 |
| 2017/0114586 A1* | 4/2017 | Tokudome .......... B60R 25/2054 |
| 2018/0163454 A1* | 6/2018 | Motoki .................... B60R 25/01 |
| 2019/0316387 A1* | 10/2019 | Egawa ..................... B60R 25/31 |
| 2019/0360256 A1* | 11/2019 | Sasaki ...................... E05F 15/73 |
| 2020/0232262 A1* | 7/2020 | Marlia ..................... B60R 25/01 |
| 2020/0240197 A1* | 7/2020 | Nagase ................ H03K 17/955 |

FOREIGN PATENT DOCUMENTS

JP 2018-96128 A 6/2018

* cited by examiner

*Primary Examiner* — Mohamad O El Sayah
(74) *Attorney, Agent, or Firm* — GREENBLUM & BERNSTEIN, P.L.C.

(57) ABSTRACT

A sensor outputs distance information indicating a distance to an object located in a detection area. A control device controls an operation of a device to be controlled based on a fact that the distance information satisfies prescribed conditions that include: i) a condition that the distance exhibits a change corresponding to an entry of the object into the detection area; ii) a condition that the distance maintains a first value for at least a first time length; and iii) a condition that a change of the distance including a monotonic decrease from the first value and a subsequent monotonic increase to a second value is finished within a second time length, wherein a difference between the first value and the second value is no greater than a threshold value.

8 Claims, 5 Drawing Sheets

REMOTE CONTROL SYSTEM, CONTROL DEVICE, AND NON-TRANSITORY COMPUTER-READABLE MEDIUM

CROSS-REFERENCE TO RELATED APPLICATION

The present application is based on Japanese Patent Application No. 2021-148478 filed on Sep. 13, 2021, the entire contents of which are incorporated herein by reference.

BACKGROUND

The presently disclosed subject matter relates to a remote control system configured to remotely control a device to be controlled based on an action of a user. The presently disclosed subject matter also relates to a control device included in the remote control system, as well as a non-transitory computer-readable medium having stored a computer program adapted to be executed by a processor installed in the control device.

Japanese Patent Publication No. 2018-096128A discloses a system for controlling the opening and closing of a door of a vehicle, that is an example of the device to be controlled, based on an action of a user. When the user performs a kick action for causing a foot to enter a detection area of a kick sensor installed in the vehicle, the opening and closing of the door of the vehicle is allowed.

SUMMARY

It is demanded to improve the convenience of a remote control system configured to remotely control a device to be controlled based on an action of a user.

An illustrative aspect of the presently disclosed subject matter provides a remote control system, comprising:
- a sensor configured to output distance information indicating a distance to an object located in a detection area; and
- a control device configured to control an operation of a device to be controlled based on a fact that the distance information satisfies prescribed conditions that include:
  - a condition that the distance exhibits a change corresponding to an entry of the object into the detection area;
  - a condition that the distance maintains a first value for at least a first time length; and
  - a condition that a change of the distance including a monotonic decrease from the first value and a subsequent monotonic increase to a second value is finished within a second time length, wherein a difference between the first value and the second value is no greater than a threshold value.

An illustrative aspect of the presently disclosed subject matter provides a control device, comprising:
- an interface configured to accept, from a sensor, distance information indicating a distance to an object located in a detection area; and
- a processor configured to allow an operation control of a device to be controlled based on a fact that the distance information satisfies prescribed conditions that include:
  - a condition that the distance exhibits a change corresponding to an entry of the object into the detection area;
  - a condition that the distance maintains a first value for at least a first time length; and
  - a condition that a change of the distance including a monotonic decrease from the first value and a subsequent monotonic increase to a second value is finished within a second time length, wherein a difference between the first value and the second value is no greater than a threshold value.

An illustrative aspect of the presently disclosed subject matter provides a non-transitory computer-readable medium having stored a computer program adapted to be executed by a processor installed in a control device, the computer program being configured to cause, when executed, the control device to:
- accept, from a sensor, distance information indicating a distance to an object located in a detection area; and
- allow an operation control of a device to be controlled based on a fact that the distance information satisfies prescribed conditions that include:
  - a condition that the distance exhibits a change corresponding to an entry of the object into the detection area;
  - a condition that the distance maintains a first value for at least a first time length; and
  - a condition that a change of the distance including a monotonic decrease from the first value and a subsequent monotonic increase to a second value is finished within a second time length, wherein a difference between the first value and the second value is no greater than a threshold value.

The first condition described above is satisfied in a case where a user places a portion of his/her body in the detection area of the sensor. The second condition described above is satisfied in a case where the user holds the portion of his/her body at the same position in the detection area for at least the first time length. The third condition described above is satisfied in a case where the user finishes, within the second time length, an action for returning the portion of the body to the original position after the portion of the body is caused to approach the sensor. The control device is configured to perform the operation control of the device to be controlled in a case where all of the three conditions described above are satisfied.

In order to avoid a situation that the operation control of the device to be controlled is performed without being based on the prescribed action performed by the user due to the fact that the sensor erroneously detects an object other than the user's body, the position of the detection area of the sensor for detecting the user's action is generally restricted. For example, in the case of the configuration described in Japanese Patent Publication No. 2018-096128A, the user must approach the foot to the sensor very closely:

On the other hand, according to the configuration of each of the illustrative aspects described above, since the user is required to hold the portion of the body at the same position somewhere in the detection area for at least the first time length as one of the conditions for allowing the operation control of the device to be controlled, it is possible to avoid a situation that the operation control of the device to be controlled is unintentionally executed due to a fact that an object accidentally passing through the detection area is detected by the sensor. In addition, since the user is required to finish, within the second time length, the action for returning the portion of the body to the original position after the portion of the body is caused to approach the sensor as one of the conditions for allowing the operation control of the device to be controlled, the control is never executed based on a mere fact that an object standing still is detected in the detection area. For example, the operation control of the device to be controlled is not executed in a case where the user is merely standing in the detection area to talk with someone or moves the portion of the body unintentionally. Accordingly, it is possible to alleviate the restriction in connection with the position of the detection area of the sensor while suppressing the occurrence of a situation that the operation control of the device to be controlled happens to be executed unintentionally. Accordingly, it is possible to improve the convenience of the remote control system configured to remotely control the device to be controlled based on the action of the user.

DESCRIPTION OF EMBODIMENTS

Exemplary embodiments will be described in detail below with reference to the accompanying drawings. In each of the drawings, the scale is appropriately changed in order to make each element illustrated have a recognizable size.

Figure 1:
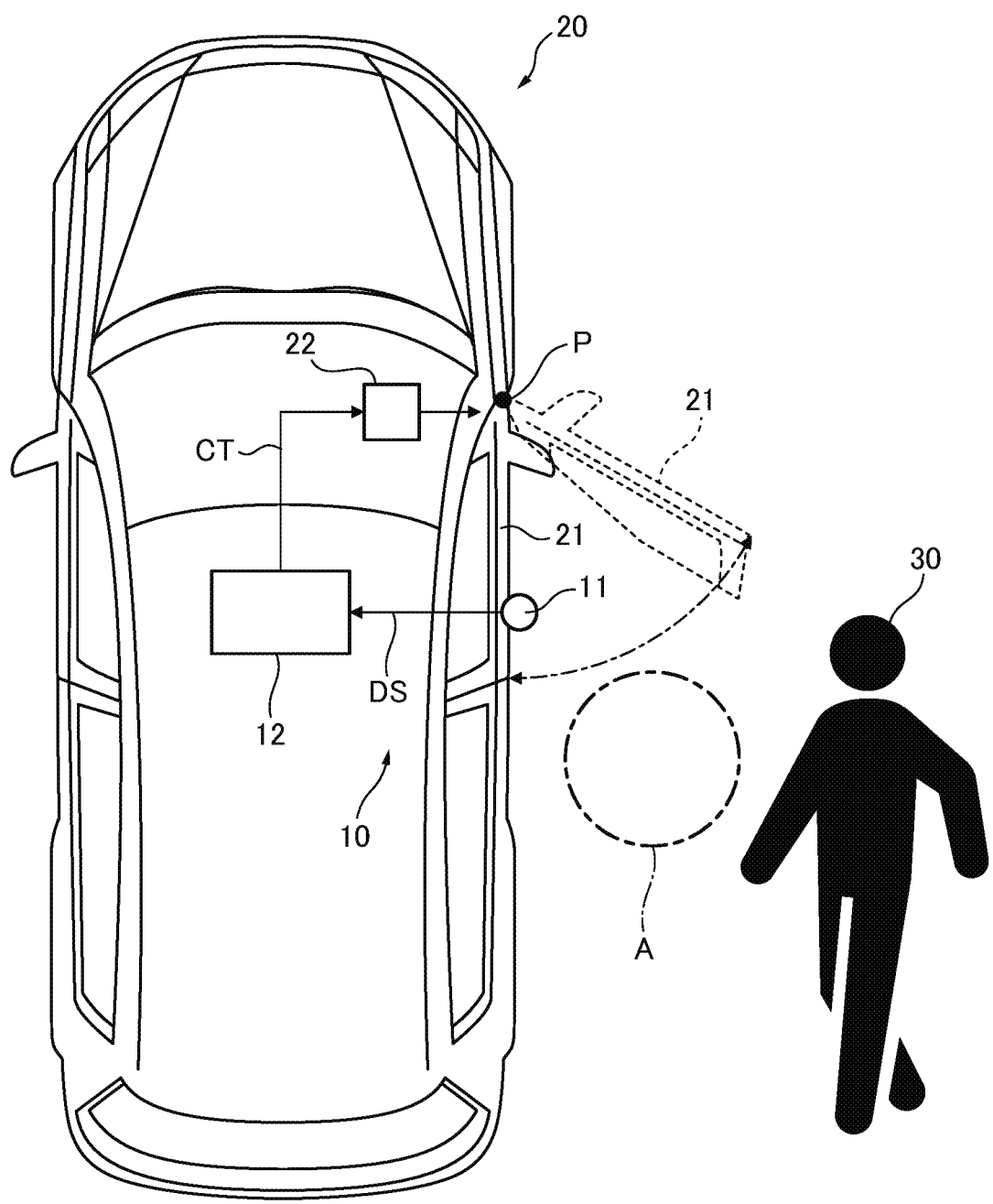
FIG. 1 illustrates a configuration of a remote control system according to an embodiment.

As illustrated in FIG. 1, a remote control system 10 according to an embodiment is installed in a vehicle 20. The remote control system 10 is configured to control an opening/closing operation of the door 21 installed in the vehicle 20 based on an action of the user 30. The shape of the vehicle 20 is merely illustrative. The vehicle 20 is an example of a mobile entity. The door 21 is an example of a reclosable body.

The remote control system 10 includes a sensor 11. The sensor 11 is configured to output distance information DS indicating a distance to an object to be detected that is located at the closest position in a detection area A. The sensor 11 may be implemented by an ultrasonic transducer, an infrared ranging sensor, a TOF (Time of Flight) camera, or the like.

The remote control system 10 includes a control device 12. The control device 12 is configured to control the operation of the opening/closing device 22 based on the distance information DS satisfying prescribed conditions. The opening/closing device 22 is a device configured to automatically open/close the door 21 of the vehicle 20. The opening/closing device 22 is an example of a device to be controlled.

Figure 2:
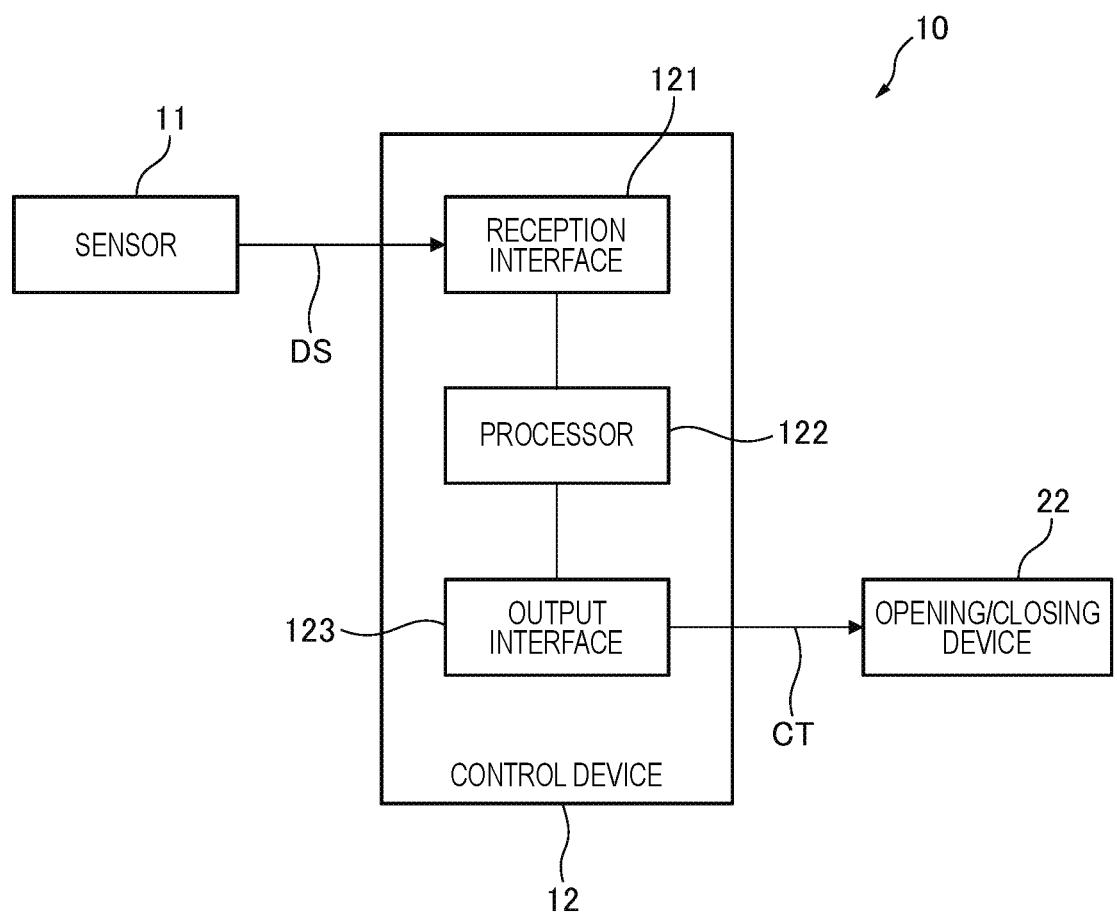
FIG. 2 illustrates a functional configuration of the remote control system of FIG. 1.

As illustrated in FIG. 2, the control device 12 includes a reception interface 121. The reception interface 121 is configured as an interface for accepting the distance information DS from the sensor 11. The distance information DS may be in the form of analog data or digital data. In a case where the distance information DS is in the form of analog data, the reception interface 121 includes an appropriate conversion circuit including an A/D converter.

The control device 12 includes a processor 122 and an output interface 123. The processor 122 is configured to output a control signal CT from the output interface 123 in a case where the distance information DS accepted by the reception interface 121 satisfies prescribed conditions. The control signal CT is configured to cause the opening/closing device 22 to perform an opening/closing operation of the door 21.

In other words, the output interface 123 is configured as an interface capable of outputting the control signal CT. The control signal CT may be an analog signal or a digital signal. In a case where the control signal CT is an analog signal, the output interface 123 includes an appropriate conversion circuit including a D/A converter.

Figure 3:
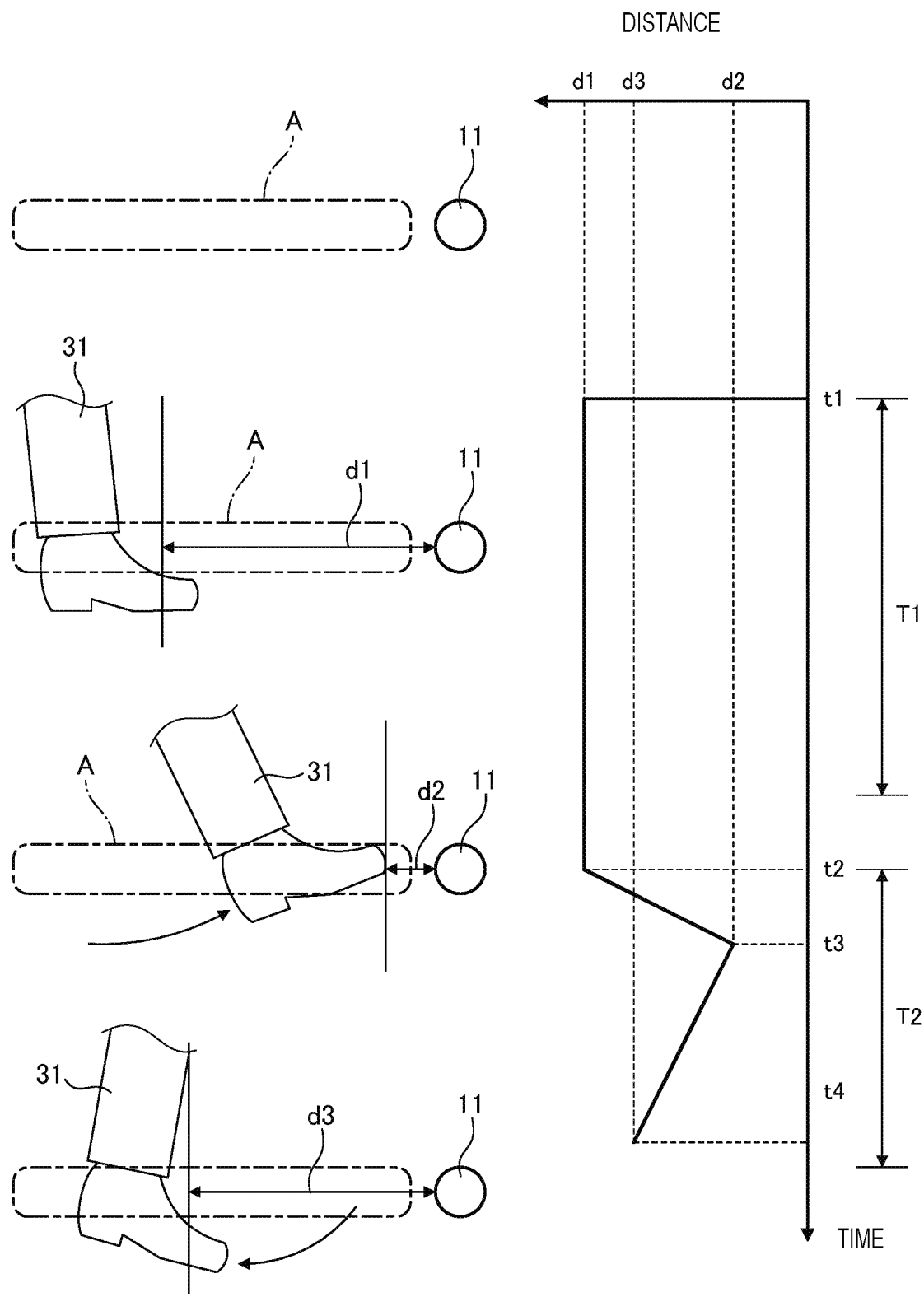
FIG. 3 illustrates a user's action to detected by the remote control system of FIG. 1.

Referring to FIG. 3, the prescribed conditions relating to the distance information DS will be described. In this example, the detection area A of the sensor 11 is set at a position capable of detecting a foot 31 of the user 30 as the object to be detected. The remote control of the opening/closing device 22 is performed by the user 30 performing a kick action in which the foot 31 is placed in the detection area A and then returned to the original position.

The above conditions include a first condition that the distance indicated by the distance information DS exhibits a change corresponding to the entry of the foot 31 into the detection area A. In the example illustrated in FIG. 3, the entry of the foot 31 into the detection area A is detected at a time point t1.

The above conditions include a second condition that the distance indicated by the distance information DS is maintained with a constant value for a first time length T1. The first time length T1 is, for example, 1 second. This condition requires the user 30 to hold the foot 31 at the same position in the detection area A for at least the first time length T1.

In the example illustrated in FIG. 3, the distance indicated by the distance information DS maintains a value d1 between the time point t1 and a time point t2. The value d1 is an example of a first value. The time length from the time point t1 to the time point t2 is longer than the first time length T1. In other words, the foot 31 of the user 30 is held in the same position for a time length longer than the first time length T1.

The above conditions include a third condition that the distance indicated by the distance information DS monotonically decreases from the first value and then monotonically increases to a second value within a second time length T2, wherein a difference between the first value and the second value is no greater than a threshold value. The second time length T2 is, for example, 1 second. The first time length T1 and the second time length T2 may be the same or different from each other.

This condition requires the user 30 to complete a stretch-out operation for bringing the foot 31 closer to the sensor 11 and then a return operation for returning the foot 31 to the original position within the second time length T2.

In the example illustrated in FIG. 3, between the time point t2 and a time point t3, the distance indicated by the distance information DS monotonically decreases from the value d1 to a value d2. Thereafter, between the time point t3 and a time point t4, the distance indicated by the distance information DS monotonically increases from the value d2 to a value d3. The value d3 is an example of the second value. The time length from the time point t2 to the time point t4 is shorter than the second time length T2. In other words, the user 30 finishes the stretch-out operation and the return operation within the second time length T2.

A portion of the foot 31 that is determined to be located at a position closest to the sensor 11 at each of the start and end of the kick action is generally different depending on a build and/or a posture of the user 30. In addition, the position of the foot 31 before being placed in the detection area A and the position of the foot 31 after being returned are not identical in general. Accordingly, as described above, the first value and the second value relating to the distance indicated by the distance information DS need not to be identical. The threshold value as for the difference between the first value and the second value may be determined as a value capable of determining that it is highly probable that a kick action is performed based on the monotonic decrease and increase of the distance.

The processor 122 of the control device 12 is configured to output a control signal CT from the output interface 123 in a case where all of the three conditions described above are satisfied. In other words, the opening/closing operation of the door 21 is performed by the opening/closing device 22 in a case where the user 30 brings the foot 31 into the detection area A of the sensor 11, holds the foot 31 at the same position for at least the first time length T1, and then finishes the kick action within the second time length T2.

In order to enhance the accuracy of determination that the kick action is performed, the conditions described above may further include a condition that a monotonic decreasing amount of the distance exceeds a threshold value.

Figure 4:
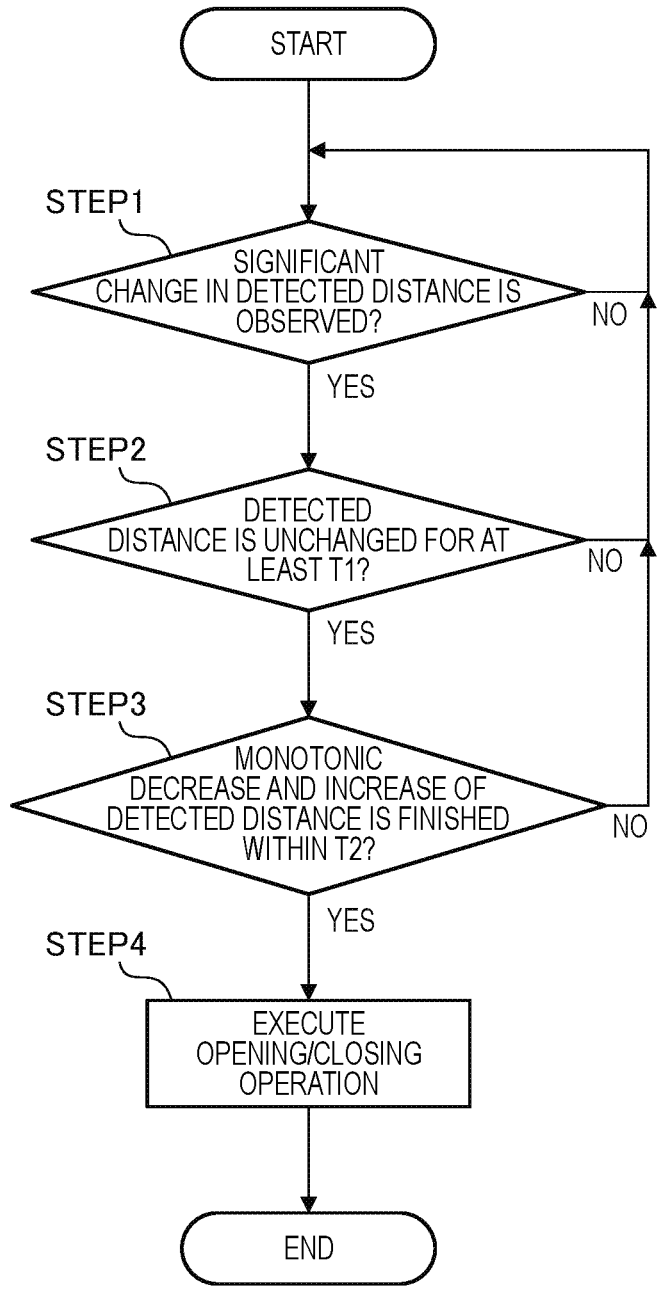
FIG. 4 illustrates a flow of processing to be executed by a processor of FIG. 2.

FIG. 4 illustrates a flow of processing to be executed by the processor 122 of the control device 12 configured as described above.

The processor 122 determines whether a significant change in the detected distance to the object indicated by the distance information DS accepted by the reception interface 121 is observed (STEP1). The "significant change" corresponds to a change in the detected distance that may occur when the foot 31 of the user 30 is placed somewhere in the detection area A. The processing is repeated until it is determined that a significant change in the detected distance indicated by the distance information DS is observed (NO in STEP1).

In a case where it is determined that a significant change in the detected distance indicated by the distance information DS is observed (YES in STEP1), the processor 122 determines whether the detected distance indicated by the distance information DS maintains the first value for at least the first time length T1 (STEP2). In a case where the detected distance changes before the first time length T1 elapses (NO in STEP2), the processing returns to STEP1.

In a case where it is determined that the detected distance indicated by the distance information DS maintains the first value for at least the first time length T1 (YES in STEP2), the processor 122 determines whether a change including a monotonic decrease of the detected distance from the first value and a subsequent monotonic increase of the detected distance to the second value is finished within the second time length T2 (STEP3). In a case where a change in the detected distance composed of the monotonic decrease and the monotonic increase is not observed, or in a case where a change in the detected distance composed of the monotonic decrease and the monotonic increase is not finished within the second time length T2 (NO in STEP3), the processing returns to STEP1.

In a case where it is determined that the change including the monotonic decrease of the detected distance from the first value and the subsequent monotonic increase of the detected distance to the second value is finished within the second time length T2 (YES in STEP3), the processor 122 outputs the control signal CT for causing the opening/closing device 22 to perform the opening/closing operation of the door 21 from the output interface 123 (STEP4). In a case where the door 21 is opened at the beginning of the kick action of the user 30, a control signal CT for causing the opening/closing device 22 to close the door 21 is outputted.

In a case where the door 21 is closed at the beginning of the kick action of the user 30, a control signal CT for causing the opening/closing device 22 to open the door 21 is outputted.

In order to avoid a situation that the opening/closing control of the door is performed without being based on the prescribed action performed by the user due to the fact that the sensor erroneously detects an object other than the user's body, the position of the detection area of the sensor for detecting the user's action is generally restricted. For example, in the case of the configuration described in Japanese Patent Publication No. 2018-096128A, the user must approach the foot to the sensor very closely.

On the other hand, according to the configuration of the present embodiment, since the user 30 is required to hold the foot 31 at the same position somewhere in the detection area A for at least the first time length T1 as one of the conditions for allowing the opening/closing control of the door 21, it is possible to avoid a situation that the opening/closing control of the door 21 is unintentionally executed due to a fact that an object accidentally passing through the detection area A is detected by the sensor 11. In addition, since the user 30 is required to finish the kick action within the second time length T2 after the holding of the foot 31 for at least the first time length T1 as one of the conditions for allowing the opening/closing control of the door 21, the control is never executed based on a mere fact that an object standing still is detected in the detection area A. For example, the opening/closing control of the door 21 is not executed in a case where the user 30 is merely standing in the detection area A to talk with someone or moves the foot 31 unintentionally. Accordingly, it is possible to alleviate the restriction in connection with the position of the detection area A of the sensor 11 while suppressing the occurrence of a situation that the opening/closing control of the door 21 happens to be executed unintentionally. Accordingly, it is possible to improve the convenience of the remote control system 10 configured to remotely control the opening/closing device 22 of the door 21 based on the kick action of the user 30.

For example, in a case where the door 21 is opened or closed with a pivot action about a pivot axis P as illustrated in FIG. 1, the detection area A may be set to a position avoiding a moving path of the door 21 being opened or closed as viewed from a direction along the pivot axis P. In this case, it is possible to facilitate avoidance of interference between the door 21 and a user's body or baggage even though the remote control for opening/closing the door 21 based on the kick action is enabled.

Figure 5:
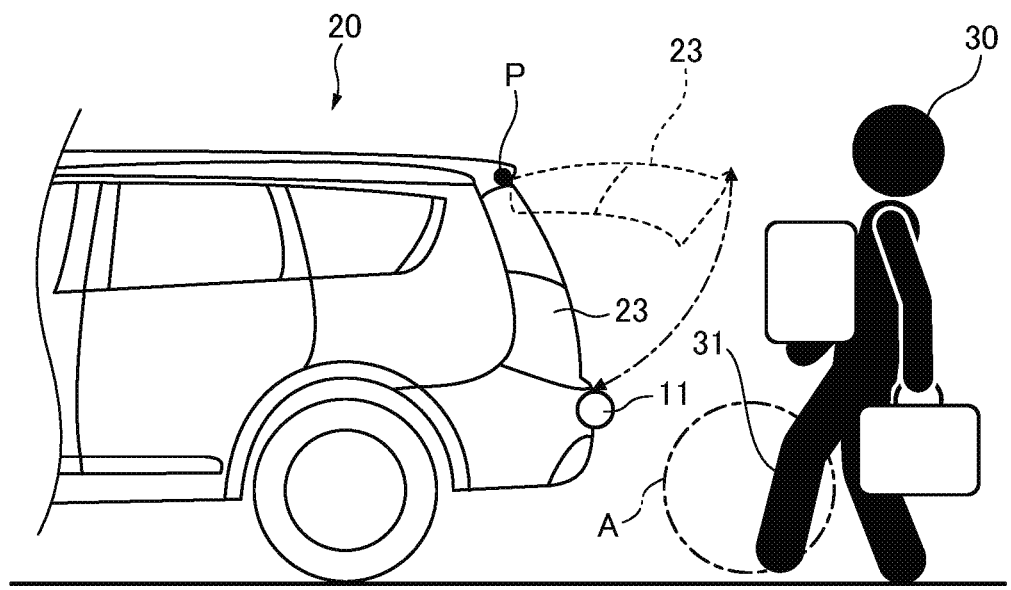
FIG. 5 illustrates a case where an opening/closing control of a back door is performed based on a kick action.

FIG. 5 illustrates a case where a back door 23 of the vehicle 20 is controlled to be opened or closed based on a kick action of the user 30. The back door 23 is also opened and closed with a pivot action about a pivot axis P. The back door 23 is an example of the reclosable body:

Also in this case, the detection area A of the sensor 11 may be set to a position a position avoiding a moving path of the back door 23 being opened or closed as viewed from a direction along the pivot axis P. Accordingly, it is possible to facilitate avoidance of interference between the back door 23 and a user's body or baggage even though the remote control for opening/closing the back door 23 based on the kick action is enabled.

The processor 122 of the control device 12 having various functions described above can be implemented by a general-purpose microprocessor operating in cooperation with a general-purpose memory. Examples of the general-purpose microprocessor include a CPU, an MPU, and a GPU. Examples of the general-purpose memory include a ROM and a RAM. In this case, a computer program for executing the above-described processing can be stored in the ROM. The ROM is an example of a non-transitory computer-readable medium having stored a computer program. The general-purpose microprocessor designates at least a part of the computer program stored in the ROM, loads the program on the RAM, and executes the processing described above in cooperation with the RAM. The above-described computer program may be pre-installed in a general-purpose memory, or may be downloaded from an external server device (not illustrated) via a wireless communication network (not illustrated) and then installed in the general-purpose memory. In this case, the external server device is an example of a non-transitory computer-readable medium having stored a computer program.

The processor 122 may be implemented by an exclusive integrated circuit capable of executing the above-described computer program, such as a microcontroller, an ASIC, and an FPGA. In this case, the above-described computer program is pre-installed in a memory element included in the exclusive integrated circuit. The memory element is an example of a non-transitory computer-readable medium having stored a computer program. The processor 122 may also be implemented by a combination of a general-purpose microprocessor and an exclusive integrated circuit.

The above embodiments are merely illustrative for facilitating understanding of the gist of the presently disclosed subject matter. The configuration according to each of the above embodiments can be appropriately modified or changed without departing from the gist of the presently disclosed subject matter.

In the above embodiment, the door that is opened/closed with the pivot action about the pivot axis is subjected to the remote control. However, a bonnet panel or a trunk panel that is opened/closed with a pivot action about a pivot axis in a similar manner may also be subjected to the remote control. A sliding door or an automatic window that is opened/closed with a sliding action along a vehicle body may also be subjected to the remote control. Each of the bonnet panel, the trunk panel, the slide door, and the automatic window is an example of the reclosable body.

In the above embodiment, the remote control is performed based on the kick action of the user 30. However, in view of the advantage that the position of the detection area A of the sensor 11 can be determined with higher flexibility, the remote control may be performed based on an action using a portion of the body of the user 30 other than the foot 31.

The remote control is not limited to the opening/closing control of the reclosable body installed in the vehicle 20. Based on an action of the user 30, an automatic parking support function (including the recovery from the parked state to the travelable state) may be activated. In this case, any one of devices installed in the vehicle for realizing the function may be an example of the device to be controlled.

The remote control system 10 may be installed in a mobile entity other than the vehicle 20. Examples of another mobile entity include railways, aircraft, and ships. Such mobile entities may not require a driver. However, in a case where a specific reclosable body to be subjected to the opening/closing control is shared by a plurality of users, whether the conditions for allowing the opening/closing control requires are approved is determined for each of the users.

The remote control system 10 need not be installed in a mobile entity. Doors and windows in homes and facilities may also be an example of the reclosable body. In addition, various equipment in a house or a facility may be an example of the device to be controlled.

The invention claimed is:

1. A remote control system, comprising:
 a sensor configured to output distance information indicating a distance to an object located in a detection area; and
 a control device configured to control an operation of a device to be controlled based on a fact that the distance information satisfies prescribed conditions that include:
  a first condition that the distance exhibits a change corresponding to an entry of the object into the detection area; and
  a second condition that the distance maintains a first value for at least a first time length after the first condition is satisfied; and
  a condition that a change of the distance including a monotonic decrease from the first value and a subsequent monotonic increase to a second value is finished within a second time length, wherein a difference between the first value and the second value is no greater than a threshold value,
 wherein the prescribed conditions further include a third condition that a change of the distance including a monotonic decrease from the first value and a subsequent monotonic increase to a second value is finished within a second time length after the second condition is satisfied, wherein a difference between the first value and the second value is no greater than a threshold value.

2. The remote control system according to claim 1,
 wherein the detection area is defined at a position capable of detecting a foot of a user as the object.

3. The remote control system according to claim 1,
 wherein the device to be controlled is a device for opening/closing a reclosable body.

4. The remote control system according to claim 3,
 wherein the reclosable body is configured to be opened/closed with a pivot action about a pivot axis; and
 wherein the detection area is defined in such a position that avoids a path of the pivot action of the reclosable body as viewed from a direction along the pivot axis.

5. The remote control system according to claim 3,
 wherein the reclosable body is installed in a mobile entity.

6. The remote control system according to claim 1, wherein the second condition requires the object to remain at a same position for the at least the first time length such that the distance maintains the first value for at least the first time length.

7. A control device, comprising:
 an interface configured to accept, from a sensor, distance information indicating a distance to an object located in a detection area; and
 a processor configured to allow an operation control of a device to be controlled based on a fact that the distance information satisfies prescribed conditions that include:
  a first condition that the distance exhibits a change corresponding to an entry of the object into the detection area; and
  a second condition that the distance maintains a first value for at least a first time length after the first condition is satisfied; and
  a condition that a change of the distance including a monotonic decrease from the first value and a subsequent monotonic increase to a second value is finished within a second time length, wherein a difference between the first value and the second value is no greater than a threshold value,
 wherein the prescribed conditions further include a third condition that a change of the distance including a monotonic decrease from the first value and a subsequent monotonic increase to a second value is finished within a second time length after the second condition is satisfied, wherein a difference between the first value and the second value is no greater than a threshold value.

8. A non-transitory computer-readable medium having stored a computer program adapted to be executed by a processor installed in a control device, the computer program being configured to cause, when executed, the control device to:
 accept, from a sensor, distance information indicating a distance to an object located in a detection area; and
 allow an operation control of a device to be controlled based on a fact that the distance information satisfies prescribed conditions that include:
  a first condition that the distance exhibits a change corresponding to an entry of the object into the detection area; and
  a second condition that the distance maintains a first value for at least a first time length after the first condition is satisfied; and
  a condition that a change of the distance including a monotonic decrease from the first value and a subsequent monotonic increase to a second value is finished within a second time length, wherein a difference between the first value and the second value is no greater than a threshold value,
 wherein the prescribed conditions further include a third condition that a change of the distance including a monotonic decrease from the first value and a subsequent monotonic increase to a second value is finished within a second time length after the second condition is satisfied, wherein a difference between the first value and the second value is no greater than a threshold value.

* * * * *